Sept. 6, 1955     E. E. MEYER     2,717,164

COMBINATION BUMPER AND TRAILER HITCH

Filed Sept. 14, 1951

INVENTOR.
EVERT E. MEYER
BY
Paul, Paul & Moore
ATTORNEYS

United States Patent Office 2,717,164
Patented Sept. 6, 1955

2,717,164

COMBINATION BUMPER AND TRAILER HITCH

Evert E. Meyer, Kiester, Minn.

Application September 14, 1951, Serial No. 246,635

2 Claims. (Cl. 280—491)

This invention relates to new and useful improvements in bumpers and trailer hitches for automotive vehicles and more particularly to a new and novel combination bumper and trailer hitch.

Conventional pickup trucks are frequently employed for towing other vehicles or trailers and when so used are provided with suitable means for coupling the trailing vehicle thereto. The invention has been found particularly useful in rural districts, as many farmers now operate one or more pickup trucks which are frequently utilized for towing a trailer or other implement. Most pickup truck bodies are provided with a hinged rear end gate which, when opened, usually swings downwardly to a position beneath the bottom wall of the truck body to facilitate loading the truck body or unloading its contents.

If the truck body is provided at its rear end with a conventional permanently mounted trailer hitch which projects rearwardly beyond the usual bumper bar, the rear end gate when swung to its normal open position may engage the projecting end of the trailer hitch with sufficient force to cause serious damage to the end gate. Such trailer hitches are therefore objectionable, because of the danger of damaging the end gate each time it is swung downwardly to its open position. Conventional trailer hitches may also cause damage to other vehicles or fixed structures, as a result of the rearwardly projecting end of the trailer hitch engaging a parked vehicle or other object, when the truck is being moved in a rearward direction.

It is therefore highly desirable that a trailer hitch be provided which is so constructed that when not in use, it may be retracted to a position within the confines of the rear end of the vehicle body, whereby it cannot cause damage to the rear end gate when opened, or to other vehicles and objects when the vehicle upon which the hitch is mounted is backing up.

An object of the present invention therefore is to provide an improved combination bumper and trailer hitch which is so constructed that the coupling member of the trailer hitch is normally concealed within the confines of the bumper bar when not in use, whereby it is out of the way of the rear end gate, when opened, and also whereby it cannot engage another vehicle or object and cause damage thereto, when the truck is propelled in a rearward direction.

A further object of the invention is to provide a combination bumper and trailer hitch comprising an elongated coupling member which may normally be concealed within the lower central portion of the bumper bar when not in use, and is provided with means for securing it in such position, said coupling member being readily swingable into a rearwardly extended operative position with respect to the bumper bar, when it is desired to couple a trailer or other piece of apparatus to the trailer hitch.

A further object is to provide a bumper bar having a forward extension at its lower central portion, and an elongated horizontal opening being provided in said forward extension, and said opening having an elongated coupling member disposed therein with its forward end pivoted to said forward extension, the rear end portion of said coupling member being swingable to an operative position rearwardly of the bumper bar and having means for locking it in such position, the rear projecting end portion of said coupling member having means therein for coupling a trailer or other apparatus thereto.

Other objects of the invention reside in the unique construction of the lower central portion of the bumper bar whereby an opening or recess is provided therein for normally retaining and concealing a coupling member having one end pivoted to the bumper bar; in the provision of suitable stops in said opening engageable with said coupling member to retain it in its retracted inoperative position within the confines of the bumper bar, when not in use, and for positioning the coupling member in its operative position; and in the provision of a single locking element for securing the coupling member in inoperative or operative position; and in the provision of an improved combination bumper and retractable trailer hitch which is extremely rugged and efficient, and is very simple and inexpensive in construction, whereby it readily lends itself for manufacture in quantity production at low cost, said invention also providing a bumper structure which may be assembled and distributed to the trade as a composite combination bumper and trailer hitch which readily lends itself for mounting on most trucks without requiring the services of a skilled mechanic or the use of special tools.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

Figure 1:
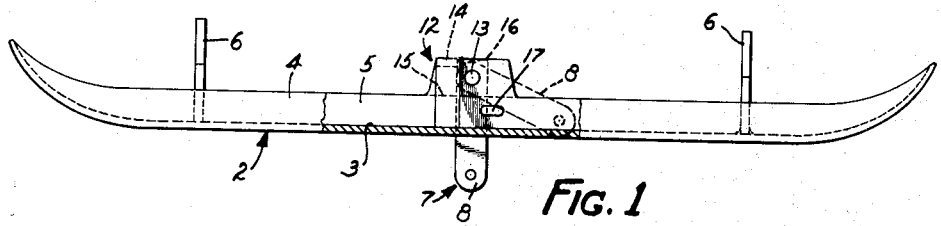
Figure 1 is a top view of my combination bumper and trailer hitch partially broken away to more clearly illustrate the construction thereof.

The novel combination bumper and trailer hitch herein disclosed is shown comprising a bumper bar, generally designated by the numeral 2, which preferably is of channel cross-section and comprises a rear transverse wall 3, and top and bottom walls 4 and 5. The bumper bar is shown provided with rearwardly and upwardly extending brackets 6 adapted to be secured to the usual supporting frame of the truck body.

An important feature of the present invention resides in the provision of a retractable trailer hitch in the lower central portion of the bumper bar, generally designated by the numeral 7. The trailer hitch comprises an elongated coupling member which may normally be concealed within the lower portion of the bumper bar, when the trailer hitch is not in use, whereby it cannot engage and damage other objects, as will be understood.

A forward extension 12 is provided in the lower central portion of the bumper bar 7, and is shown having a suitable opening or recess 9 therein, partially defined by the wall 5 and a lower wall member 11. The walls 5 and 11 constitute the forward extension 12, and the opening 9 extends the length of the extension 12 in a fore-and-aft direction.

The coupling member 8 which preferably is in the form of a flat bar, has its rear end pivoted to the forward end of the extension 12 by a pivot pin or bolt 13, traversing aligned openings in the spaced walls 5 and 11, and a corresponding opening provided in the forward end of coupling member 8. Limit stops 14 and 15 are provided in the opening 9 adapted to be engaged by the coupling member 8, when in its retracted inoperative position, indicated in dotted lines in Figure 3, or when in its extended operative position, shown in full lines in Figure 3.

Figure 3:
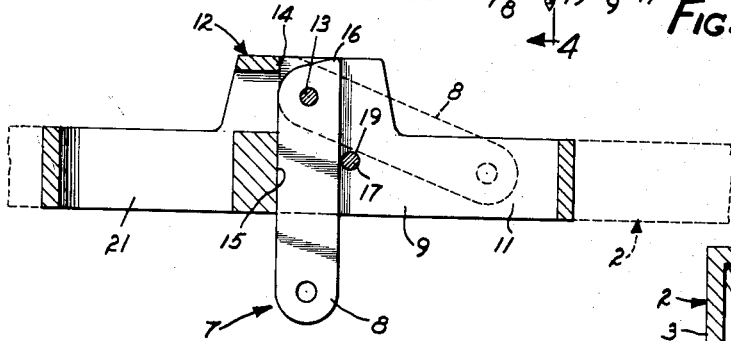
Figure 3 is an enlarged detail sectional view on the line 3—3 of Figure 2, showing the two positions of the coupling member and the limit stops engaged thereby.

The coupling member 8 is shown having an offset portion 16 at its forward end adapted to engage limit stop 14, when the coupling member is in its inoperative position, indicated in Figure 3. Limit stop 15 is positioned to be engaged by the coupling member when in its extended operative position shown in full lines in Figure 3.

Figure 4:
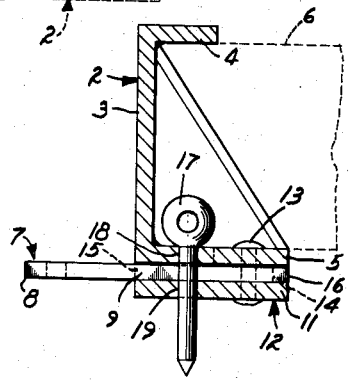
Figure 4 is an enlarged detail sectional view on the line 4—4 of Figure 2.

Means is provided for locking the coupling member 8 in inoperative or operative positions and is shown comprising a single eye-bolt 17, adapted to be received in aligned apertures 18 and 19 in the wall members 5 and 11, respectively, as best illustrated in Figure 4. The apertures 18 and 19 are so related to the coupling member 8 and the limit stops 14 and 15, that when the coupling member is in its extended operative position, shown in full lines in Figure 3, and the lock pin 17 is inserted in the apertures 18 and 19, the coupling member is locked against swinging movement by the lock pin and the limit stop 15, as will readily be understood by reference to Figure 3, whereby said member cannot vibrate or rattle when traveling over rough roads. In like manner, when the lock pin is withdrawn and the coupling member is swung to its inoperative retracted position, indicated in dotted lines in Figure 3, and the locking pin is again inserted in the apertures 18 and 19, said coupling member is locked against pivotal movement by the pin 17 and stop 14.

Figure 5:
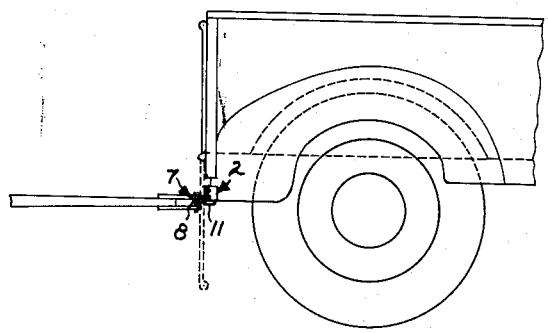
Figure 5 is a view on a reduced scale, showing the rear end portion of a pick-up truck with the novel bumper mounted thereon, the dotted lines indicating the open position of the pivoted end gate of the truck body.

The novel combination bumper and trailer hitch herein disclosed has been found particularly useful on pick-up trucks which are frequently utilized for towing other vehicles or apparatus necessitating the use of a hitch at the rear end thereof. When a rearward projecting trailer hitch is employed in a conventional pick-up truck having a pivoted rear end gate or wall, such end gate may frequently be seriously damaged by striking the projecting end of the trailer hitch, when the driver opens the end gate and allows it to swing by gravity to its open dotted line position shown in Figure 5. Such damage to the end gate may be costly and in some cases the hinges of the end gate may also be damaged when the end gate is swung open and comes to a sudden stop as a result of striking the rearwardly projecting end portion of the trailer hitch.

Such damage to the end gate and its mounting is positively eliminated by the use of the novel combination bumper and trailer hitch herein disclosed, because when the trailer hitch is not utilized, it may be retracted to a position within the opening 9 in the lower central portion of the bumper bar and is substantially concealed therein. The operation of swinging the trailer hitch from its inoperative retracted position to its extended operative position, and vice versa, is an extremely simple one and may be accomplished in a matter of seconds. The lock pin 17 is of sufficient length and weight to assure its retention in the apertures 18 and 19 under normal use, without the use of separable means for locking it in such position. It will thus be noted that to shift the locking bar from one position to another simply requires lifting the locking pin from its supporting apertures with one hand and with the other hand flip the coupling member to the desired position, and then return the locking pin to its locking position in the apertures 18 and 19.

The apparatus is extremely simple and inexpensive in construction and may be manufactured as a composite unit, applicable for mounting on various types and makes of trucks. In some cases it may be necessary to alter the construction of the mounting brackets 6 to adapt the bumper for mounting on different makes of truck frames, but this may readily be accomplished by making the mounting bracket 6 detachable so that the proper type mounting brackets may be utilized for each make of truck.

Figure 2:
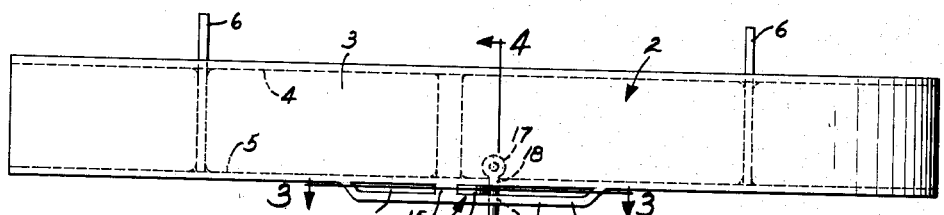
Figure 2 is a rear view of the bumper showing the coupling member in extended operative position.

It will also be noted by reference to the drawing that the bumper is shown of channel cross section. Obviously, the bumper bar need not necessarily be so configurated because the mounting of the coupling member 8 is of such a nature that it may readily be embodied in bumpers of different cross-sections. The opening 21 shown at the left-hand side of the opening 9, when viewed as shown in Figures 2 and 3, has no particular utility in the present instance. It was provided primarily for the purpose of enhancing the appearance of the bumper when viewing it from a position rearwardly of the truck.

The foregoing detailed description has been given for clearness of understanding only, and no unnecessary limitations should be understood therefrom, but the appended claims should be construed as broadly as permissible in view of the prior art.

I claim as my invention:

1. In a combination bumper and trailer hitch, a bumper bar of angular cross-section having an elongated upright wall portion and a lower horizontally disposed forwardly extending flange, a wall member secured to the underside of said bumper flange intermediately of the bumper ends and spaced downwardly therefrom to provide an elongated guide opening, an elongated coupling member supported in said guide opening, means pivoting the forward end of said coupling member to the forward end portions of the forwardly extending spaced apart wall portions of said bumper flange and wall member adjacent to one end of said elongated opening, the over-all length of said guide opening being relatively greater than the over-all length of the coupling member, whereby when said coupling member is not in use, it may be swung into and completely concealed within said opening and within the confines of the bumper, and the over-all length of the coupling member and its pivotal connection with the bumper flange being such that when the coupling member is swung rearwardly into load-engaging position against said abutment, said coupling member will be disposed at substantially right angular relation to the longitudinal axis of the bumper with its rear end disposed well rearwardly of the bumper, thereby to facilitate coupling a trailer or implement thereto.

2. A combination bumper and trailer as defined in claim 1, wherein the forwardly extending wall portions of the bumper flange and said wall member have vertically aligned apertures therein for receiving a single locking pin for selectively retaining the coupling member in its rearwardly extended operative position or in its retracted inoperative position within the bumper opening, the vertically aligned apertures in the forwardly extending wall portions of the bumper flange and said wall member being so located that when the coupling member is in its retracted position, said locking pin will engage one side edge of the coupling member and retain it in retracted position, and when the coupling member is in its extended operative position, said locking pin will engage the opposite side edge of the coupling member and cooperate with said abutment to retain the coupling member in its rearwardly extended operative position.

References Cited in the file of this patent
UNITED STATES PATENTS

| | | |
|---|---|---|
| 2,309,850 | Klawitter | Feb. 2, 1943 |
| 2,425,838 | Schultz | Aug. 19, 1947 |
| 2,527,155 | Schulenz | Oct. 24, 1950 |
| 2,531,859 | Mock | Nov. 28, 1950 |